(12) United States Patent
Komuro

(10) Patent No.: US 11,691,400 B2
(45) Date of Patent: Jul. 4, 2023

(54) RESIN COMPOSITION AND MULTILAYER STRUCTURE USING SAME

(71) Applicant: THE NIPPON SYNTHETIC CHEMICAL INDUSTRY CO., LTD., Osaka (JP)

(72) Inventor: Ryohei Komuro, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/009,800

(22) Filed: Jun. 15, 2018

(65) Prior Publication Data

US 2018/0291177 A1 Oct. 11, 2018

Related U.S. Application Data

(63) Continuation of application No. PCT/JP2016/088316, filed on Dec. 22, 2016.

(30) Foreign Application Priority Data

Dec. 25, 2015 (JP) ................................ 2015-253453

(51) Int. Cl.
| | | |
|---|---|---|
| *C08L 29/04* | (2006.01) | |
| *C08K 5/098* | (2006.01) | |
| *B32B 27/28* | (2006.01) | |
| *B32B 27/30* | (2006.01) | |
| *B32B 7/12* | (2006.01) | |
| *B32B 27/08* | (2006.01) | |
| *B32B 27/34* | (2006.01) | |

(52) U.S. Cl.
CPC .............. *B32B 27/28* (2013.01); *B32B 7/12* (2013.01); *B32B 27/08* (2013.01); *B32B 27/306* (2013.01); *B32B 27/34* (2013.01); *C08K 5/098* (2013.01); *C08L 29/04* (2013.01); *B32B 2307/7244* (2013.01); *C08K 2201/014* (2013.01)

(58) Field of Classification Search
CPC ............. C08K 5/098; C08K 2201/014; C08L 23/0861; C08L 29/04; B29B 9/12; B29B 9/06; B29B 9/16; B32B 27/28; B32B 7/12; B32B 27/08; B32B 27/306; B32B 27/34; B32B 2307/7244
See application file for complete search history.

(56) References Cited

U.S. PATENT DOCUMENTS

| | | | |
|---|---|---|---|
| 5,032,632 A | 7/1991 | Saxton | |
| 5,260,371 A * | 11/1993 | Chen | ................. C08K 3/22 524/291 |
| 6,353,048 B1 | 3/2002 | Onishi et al. | |
| 2015/0159005 A1* | 6/2015 | Nakazawa | ............ B32B 27/08 426/412 |
| 2016/0177080 A1 | 6/2016 | Inoue | |
| 2016/0221313 A1 | 8/2016 | Kawai et al. | |
| 2016/0311984 A1 | 10/2016 | Fukuyama et al. | |

FOREIGN PATENT DOCUMENTS

| | | | |
|---|---|---|---|
| CN | 1056509 A | 11/1991 | |
| CN | 1712213 A | 12/2005 | |
| EP | 1609595 A1 | 12/2005 | |
| JP | 04-227744 A | 8/1992 | |
| JP | 7-118469 | 5/1995 | |
| JP | 7-118470 | 5/1995 | |
| JP | 8-52845 | 2/1996 | |
| JP | 8-239528 | 9/1996 | |
| JP | 08-253649 A | 10/1996 | |
| JP | 2000290455 A | * 10/2000 | |
| JP | 2001-81262 | 3/2001 | |
| JP | 2001-200123 | 7/2001 | |
| JP | 2001-288323 A | 10/2001 | |
| JP | 2001-348017 A | 12/2001 | |
| JP | 2002-060496 A | 2/2002 | |
| JP | 2012-92160 | 5/2012 | |
| JP | 2012-153815 A | 8/2012 | |
| JP | 2015-071709 A | 4/2015 | |
| JP | 2015083665 A | * 4/2015 | ............. B32B 25/08 |
| TW | 2015-29673 A | 8/2015 | |
| WO | 2010/030892 | 3/2010 | |

OTHER PUBLICATIONS

International Search Report in Internatioal Patent Application No. PCT/JP2016/088316, dated Apr. 4, 2017.
International Preliminary Report on Patentability in International Patent Application No. PCT/JP2016/088316, dated Jun. 26, 2018.
European Search Report issued for EP Application. No. 16878876.8 dated Jul. 10, 2019.
Singaporean Search Report dated Jun. 10, 2019 issued in Singaporean Patent Application No. 11201805019X with English translation.
Chinese Office Action issued for CN Patent Application No. 201680075210.4, dated Apr. 13, 2020, English translation.
Japanese Office Action issued in JP Patent Application No. 2016-575273, dated Jun. 30, 2020, English translation.

(Continued)

*Primary Examiner* — John D Freeman
(74) *Attorney, Agent, or Firm* — Greenblum & Bernstein, P.L.C.

(57) ABSTRACT

A resin composition includes: an ethylene-vinyl ester copolymer saponified product (A); and fatty acid metal salts, wherein the fatty acid metal salts include at least two fatty acid metal salts selected from a fatty acid metal salt having 3 to 12 carbon atoms (B), a fatty acid metal salt having 13 to 20 carbon atoms (C), and a fatty acid metal salt having 21 to 29 carbon atoms (D), and wherein at least one of the fatty acid metal salts selected from the fatty acid metal salts (B), (C), and (D) includes a zinc salt. The resulting resin composition is capable of forming a multilayer structure that has suppressed occurrence of appearance failure and minimized color tone deterioration at the time of its melt molding.

16 Claims, No Drawings

(56) References Cited

OTHER PUBLICATIONS

Singaporean Search Report issued in Singaporean Patent Application No. 11201805019X, dated Feb. 3, 2020.
TW OA including Search Report issued in TW Patent App. No. 105142582 dated Feb. 17, 2020, English translation.
JP OA issued in JP Patent Application No. 2016-575273 dated Mar. 24, 2020, English translation.
TW Office Action issued in TW Patent Application No. 105142582, dated Nov. 28, 2020, English translation.
JP Office Action issued in JP Patent Application No. 2016-575273, dated Nov. 28, 2020, English translation.
Decision of Refusal issued in Chinese Patent Application No. 201680075210.4, dated Jun. 28, 2021, English translation.
$2^{nd}$ Office Action issued in CN Patent Application No. 201680075210.4, dated Jan. 8, 2021, English translation.
Office Action issued in JP Patent Application No. 2016-575273, dated May 6, 2022, translation.
Rejection Decision issued in TW Patent Application No. 105142582, dated Nov. 1, 2021, English translation.
Reconsideration Report by Examiner before Appeal mailed in Japanese Patent Application No. 2016-575273 dated Jan. 16, 2023, along with English translation thereof.
Decision of Dismissal of Amendment issued in JP Patent Application No. 2016-575273, dated Jul. 12, 2022, translation.
Decision of Refusal issued in Japanese Patent Application No. 2016-575273, dated Jul. 12, 2022, translation.

\* cited by examiner

RESIN COMPOSITION AND MULTILAYER STRUCTURE USING SAME

RELATED APPLICATION

This application is a continuation of International Application No. PCT/JP2016/088316, filed on Dec. 22, 2016, which claims priority to Japanese Patent Application No. 2015-253453, filed on Dec. 25, 2015, the entire contents of each of which are hereby incorporated by reference.

TECHNICAL FIELD

The present disclosure relates to a resin composition obtained by using an ethylene-vinyl ester copolymer saponified product (hereinafter sometimes abbreviated as "EVOH") and a multilayer structure using the resin composition, and more specifically, to a resin composition capable of forming a multilayer structure that is suppressed in occurrence of an appearance failure and is alleviated in color tone deterioration at the time of its melt molding even when multilayer coextrusion molding is applied, and a multilayer structure including a resin composition layer using the resin composition.

BACKGROUND ART

A packaging material for packaging food and various articles is often required to have a gas barrier property, in particular, an oxygen barrier property. The requirement is intended to prevent oxidative deterioration of packaged contents due to oxygen or the like, and to maintain the freshness of the food for a long time. Accordingly, in a conventional packaging material, a gas barrier layer configured to prevent the permeation of oxygen has been arranged to prevent the permeation of oxygen or the like.

Examples of the gas barrier layer generally arranged in the conventional packaging material may include a gas barrier layer formed of an inorganic matter and a gas barrier layer formed of an organic matter. A metal layer, such as aluminum foil or an aluminum deposited layer, or a metal compound layer, such as a silicon oxide deposited layer or an aluminum oxide deposited layer, has been used as a gas barrier layer formed of inorganic matter. However, the metal layer, such as the aluminum foil or the aluminum deposited layer, has, for example, the following drawbacks. Packaged contents cannot be seen and the metal layer is poor in disposability. In addition, the metal compound layer, such as the silicon oxide deposited layer or the aluminum oxide deposited layer, has, for example, the following drawback. A crack may be caused by, for example, the deformation of the metal compound layer at the time of its secondary processing, such as printing or lamination, vibration or impact at the time of its transportation, or the deformation or falling of the packaging material, which significantly reduces the gas barrier property of the packaging material.

Meanwhile, a layer formed of a vinylidene chloride polymer, or a layer formed of a vinyl alcohol polymer, such as a polyvinyl alcohol or an EVOH, has been used as the gas barrier layer formed of organic matter. The usage of vinylidene chloride polymer has been significantly reduced in recent years because the polymer involves a risk, such as the occurrence of a harmful chlorine compound at the time of its disposal by incineration. The layer formed of vinyl alcohol polymer, such as polyvinyl alcohol or the EVOH, has been widely used in packaging materials because the layer has the following advantages. The layer is transparent, is relatively suppressed in occurrence of a crack in the gas barrier layer formed of the layer, and creates few problems in terms of disposal.

The above-mentioned packaging material is, for example, a multilayer structure obtained by laminating a layer formed of the EVOH serving as an intermediate layer and a thermoplastic resin other than the EVOH (other thermoplastic resin) through intermediation of an adhesive resin layer or a polyamide layer. As described above, such multilayer structure has been utilized by being molded into, for example, a film or a sheet serving as a packaging material, such as a food packaging material, a drug packaging material, an industrial chemical packaging material, or an agricultural chemical packaging material, or a container, such as a bottle, through the utilization of its excellent gas barrier property and excellent transparency.

Due to security concerns in recent years, a multilayer structure having high visibility (transparency) tends to be preferred so that its contents can be observed even from the outside.

Coextrusion molding is often applied at the time of the molding of such multilayer structure. At this time, roughening occurs at a lamination interface between an EVOH resin composition layer and a layer adjacent thereto depending on molding conditions, and as a result, the appearance (transparency) of the multilayer structure reduces in some cases.

In general, with a view to improving the moldability of EVOH, in Patent Literature 1, there is a disclosure of an EVOH pellet to whose surface a higher fatty acid adheres. In Patent Literature 2, there is a disclosure of a resin composition formed of EVOH and a fatty acid metal salt of a metal belonging to Group 2 in the periodic table. In Patent Literature 3, there is a disclosure of a resin composition formed of two kinds of EVOH different from each other in ethylene composition and a higher fatty acid zinc salt. In Patent Literature 4, there is a disclosure of a resin composition characterized in that a fatty acid metal salt is present in each of the following portions: in an EVOH pellet; and on the external surface of the pellet.

RELATED ART DOCUMENTS

Patent Documents

PTL 1: JP-A-2012-092160
PTL 2: JP-A-2000-290455
PTL 3: JP-A-2015-083665
PTL 4: JP-A-2001-200123

SUMMARY OF INVENTION

However, in association with the sophistication of a molding technology (e.g., the diversification of a feed block die shape and the high functionalization of a molding apparatus) and the high functionalization of a multilayer structure (e.g., an increase in number of layers) in recent years, further improvements of the resin compositions described in Patent Literatures 1 to 4 have been desired because when any one of the resin compositions is subjected to multilayer coextrusion molding, for example, problems such as the transparency of the multilayer structure being insufficient, and depending on molding conditions, deterioration of color tone may occur.

In view of the foregoing, under such background, according to the present disclosure, there is provided a resin composition capable of forming a multilayer structure that has suppressed occurrence of an appearance failure and minimized color tone deterioration at the time of its melt molding, and a multilayer structure including a resin composition layer using the resin composition.

Thus, the inventor has made extensive investigations in view of the circumstances, and as a result, has found that when a resin composition having the following features is used, in, for example, the case where multilayer coextrusion molding is performed, a multilayer structure suppressed in appearance failure, in particular, reduced transparency derived from interface roughening occurring at at least one of a lamination interface between an EVOH layer and an adhesive resin layer, and a lamination interface between the EVOH layer and a polyamide layer is obtained, and the deterioration of its color tone at the time of its melt molding is alleviated. Such a resin composition contains an EVOH (A), and at least two fatty acid metal salts selected from a fatty acid metal salt having 3 to 12 carbon atoms (B), a fatty acid metal salt having 13 to 20 carbon atoms (C), and a fatty acid metal salt having 21 to 29 carbon atoms (D); and at least one of the fatty acid metal salts selected from the fatty acid metal salts (B), (C), and (D) is a zinc salt.

That is, according to a first aspect of the present disclosure, there is provided a resin composition, including: an EVOH (A); and fatty acid metal salts, wherein the fatty acid metal salts include at least two fatty acid metal salts selected from a fatty acid metal salt having 3 to 12 carbon atoms (B), a fatty acid metal salt having 13 to 20 carbon atoms (C), and a fatty acid metal salt having 21 to 29 carbon atoms (D), and wherein at least one of the fatty acid metal salts selected from the fatty acid metal salts (B), (C), and (D) includes a zinc salt.

In addition, according to a second aspect of the present disclosure, there is provided a multilayer structure, which is obtained by laminating a thermoplastic resin layer on at least one surface of a resin composition layer containing the resin composition through intermediation of an adhesive resin layer. According to a third aspect of the present disclosure, there is provided a multilayer structure, which is obtained by laminating a polyamide layer on at least one surface of a resin composition layer containing the resin composition.

According to the present disclosure, the resin composition, including: the EVOH (A); and the fatty acid metal salts, wherein the fatty acid metal salts include at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D), and wherein at least one of the fatty acid metal salts selected from the fatty acid metal salts (B), (C), and (D) includes the zinc salt is provided. Accordingly, a multilayer structure obtained by using the resin composition can be a multilayer structure that is suppressed in appearance failure derived from interface roughening occurring at at least one of a lamination interface between an EVOH layer and an adhesive resin layer, and a lamination interface between the EVOH layer and a polyamide layer, and that is alleviated in color tone deterioration at the time of its melt molding.

In addition, in the case of a resin composition in which the total content of the zinc salt is from 0.0005 parts by weight to 0.035 parts by weight with respect to 100 parts by weight of the EVOH (A) in terms of a metal, a multilayer structure obtained by using the resin composition can be further suppressed in appearance failure derived from interface roughening occurring at at least one of a lamination interface between an EVOH layer and an adhesive resin layer, and a lamination interface between an EVOH layer and a polyamide layer, and that is further alleviated in color tone deterioration at the time of its melt molding.

In the case of a resin composition in which a content of the fatty acid metal salt having 3 to 12 carbon atoms (B) is from 0.0005 parts by weight to 0.0345 parts by weight with respect to 100 parts by weight of the EVOH (A) in terms of a metal, a multilayer structure obtained by using the resin composition can be an excellent multilayer structure that is still further suppressed in appearance failure derived from interface roughening occurring at at least one of a lamination interface between an EVOH layer and an adhesive resin layer, and a lamination interface between the EVOH layer and a polyamide layer, and that is still further alleviated in color tone deterioration at the time of its melt molding.

In the case of a resin composition in which a content of the fatty acid metal salt having 13 to 20 carbon atoms (C) is from 0.0005 parts by weight to 0.0345 parts by weight with respect to 100 parts by weight of the EVOH (A) in terms of a metal, a multilayer structure obtained by using the resin composition can be an excellent multilayer structure that is still further suppressed in appearance failure derived from interface roughening occurring at at least one of a lamination interface between an EVOH layer and an adhesive resin layer, and a lamination interface between the EVOH layer and a polyamide layer, and that is still further alleviated in color tone deterioration at the time of its melt molding.

In the case of a resin composition in which a content of the fatty acid metal salt having 21 to 29 carbon atoms (D) is from 0.0005 parts by weight to 0.0345 parts by weight with respect to 100 parts by weight of the EVOH (A) in terms of a metal, a multilayer structure obtained by using the resin composition can be an excellent multilayer structure that is still further suppressed in appearance failure derived from interface roughening occurring at at least one of a lamination interface between an EVOH layer and an adhesive resin layer, and a lamination interface between the EVOH layer and a polyamide layer, and that is still further alleviated in color tone deterioration at the time of its melt molding.

DESCRIPTION OF EMBODIMENTS

The construction of the present disclosure is described in detail below. However, the following description describes an example of a desired embodiment of the present disclosure, and the present disclosure is not limited to its contents.

According to the present disclosure, there is provided a resin composition, including: an EVOH (A); and fatty acid metal salts, wherein the fatty acid metal salts include at least two fatty acid metal salts selected from a fatty acid metal salt having 3 to 12 carbon atoms (B), a fatty acid metal salt having 13 to 20 carbon atoms (C), and a fatty acid metal salt having 21 to 29 carbon atoms (D), and wherein at least one of the fatty acid metal salts selected from the fatty acid metal salts (B), (C), and (D) includes a zinc salt.

The construction of the present disclosure is hereinafter described in detail.

<(A) EVOH>

In ordinary cases, the EVOH (A) to be used in the present disclosure is a resin obtained by copolymerizing ethylene and a vinyl ester monomer, and then saponifying the resultant copolymer, which is a water-insoluble thermoplastic resin. An arbitrary known polymerization method, such as solution polymerization, suspension polymerization, or emulsion polymerization, may be used as a polymerization method. In general, however, solution polymerization involving using methanol as a solvent is used. The saponification of the resultant ethylene-vinyl ester copolymer may also be performed by a known method.

That is, the EVOH (A) to be used in the present disclosure contains an ethylene structural unit and a vinyl alcohol structural unit as main components, and typically contains a certain amount of a vinyl ester structural unit, which remains without being saponified, in some cases.

Vinyl acetate is typically used as the vinyl ester monomer because vinyl acetate is readily available from the market, and impurities can be treated with satisfactory efficiency at the time of its production. Examples thereof also include aliphatic vinyl esters, such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters, such as vinyl benzoate. The vinyl ester monomer is typically an aliphatic vinyl ester having 3 to 20 carbon atoms, preferably 4 to 10 carbon atoms, particularly preferably 4 to 7 carbon atoms. Those vinyl ester monomers are typically used alone, but may be used in combination thereof as required.

The content of the ethylene structural unit in the EVOH (A) is a value measured on the basis of ISO 14663, and is typically from 20 mol % to 60 mol %, preferably from 25 mol % to 50 mol %, particularly preferably from 25 mol % to 35 mol %. When such content is too small, the gas barrier property of the resin composition at the time of high humidity or the melt moldability thereof tends to reduce. In contrast, when the content is excessively large, the gas barrier property thereof tends to reduce.

The saponification degree of a vinyl ester component in the EVOH (A) is a value measured on the basis of JIS K6726 (provided that the EVOH is turned into a solution by being uniformly dissolved in a mixed solvent of water and methanol), and is typically from 90 mol % to 100 mol %, preferably from 95 mol % to 100 mol %, particularly preferably from 99 mol % to 100 mol %. When such saponification degree is too low, the gas barrier property, thermal stability, moisture resistance, or the like of the resin composition tends to reduce.

In addition, the melt flow rate (MFR) (210° C., load: 2,160 g) of the EVOH (A) is typically from 0.5 g/10 min to 100 g/10 min, preferably from 1 g/10 min to 50 g/10 min, particularly preferably from 3 g/10 min to 35 g/10 min. When such MFR is excessively high, the film formability of the resin composition tends to reduce. In addition, when the MFR is too low, it tends to be difficult to perform the melt extrusion of the resin composition.

In addition, the EVOH (A) to be used in the present disclosure may further contain a structural unit derived from a comonomer to be described below to the extent that the effects of the present disclosure are not impaired (e.g., 10 mol % or less).

Examples of the comonomer include the following comonomers: olefins, such as propylene, 1-butene, and isobutene; hydroxy group-containing α-olefins, such as 2-propen-1-ol, 3-buten-1-ol, 4-penten-1-ol, 5-hexen-1-ol, 3,4-dihydroxy-1-butene, and 5-hexene-1,2-diol, and derivatives thereof, such as esterified products, for example, a 3,4-diacyloxy-1-butene, particularly 3,4-diacetoxy-1-butene, and acylated products, for example, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxyalkylvinylidenes, such as 2-methylenepropane-1,3-diol and 3-methylenepentane-1,5-diol; hydroxyalkylvinylidene diacetates, such as 1,3-diacetoxy-2-methylenepropane, 1,3-dipropionyloxy-2-methylenepropane, and 1,3-dibutyronyloxy-2-methylenepropane; unsaturated acids, such as acrylic acid, methacrylic acid, crotonic acid, phthalic acid (anhydride), maleic acid (anhydride), and itaconic acid (anhydride), or salts thereof, or mono or dialkyl esters thereof each having to 18 carbon atoms; acrylamides, such as acrylamide, an N-alkylacrylamide having 1 to 18 carbon atoms, N,N-dimethylacrylamide, 2-acrylamidopropanesulfonic acid or salts thereof, and acrylamidopropyldimethylamine, acid salts thereof, or quaternary salts thereof; methacrylamides, such as methacrylamide, an N-alkylmethacrylamide having 1 to 18 carbon atoms, N,N-dimethylmethacrylamide, 2-methacrylamidopropane sulfonic acid or salts thereof, and methacrylamidopropyldimethylamine, acid salts thereof, or quaternary salts thereof; N-vinylamides, such as N-vinylpyrrolidone, N-vinylformamide, and N-vinylacetamide; vinyl cyanides, such as acrylonitrile and methacrylonitrile; vinyl ethers, such as alkyl vinyl ethers, hydroxyalkyl vinyl ethers, and alkoxyalkyl vinyl ethers each having 1 to 18 carbon atoms; halogenated vinyl compounds, such as vinyl chloride, vinylidene chloride, vinyl fluoride, vinylidene fluoride, and vinyl bromide; vinylsilanes, such as trimethoxyvinylsilane; allyl acetate; halogenated allyl compounds, such as allyl chloride; allyl alcohols, such as allyl alcohol and dimethoxy allyl alcohol; trimethyl-(3-acrylamido-3-dimethylpropyl)-ammonium chloride; and acrylamido-2-methylpropanesulfonic acid.

Further, an EVOH subjected to "post-modification," such as urethanation, acetalation, cyanoethylation, or oxyalkylenation, may be used.

In particular, EVOH obtained by copolymerizing hydroxy group-containing α-olefins are preferred because each of such EVOH has satisfactory secondary moldability. An EVOH having a primary hydroxy group in a side chain thereof, in particular, an EVOH having a 1,2-diol in a side chain thereof is preferred.

The EVOH having a 1,2-diol in a side chain thereof contains a 1,2-diol structural unit in a side chain thereof. The 1,2-diol structural unit is specifically a structural unit represented by the following general formula (1).

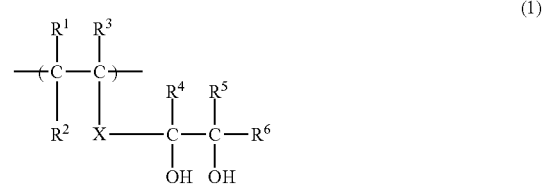

[In the general formula (1), $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.]

Examples of the organic group in the 1,2-diol structural unit represented by the general formula (1) include saturated hydrocarbon groups, such as a methyl group, an ethyl group, a n-propyl group, an isopropyl group, a n-butyl group, an isobutyl group, and a tert-butyl group, aromatic hydrocarbon groups, such as a phenyl group and a benzyl group, a halogen atom, a hydroxy group, an acyloxy group, an alkoxy carbonyl group, a carboxyl group, and a sulfonic acid group.

In particular, when the EVOH contains the 1,2-diol structural unit represented by the general formula (1), its content is preferably from 0.1 mol % to 20 mol %, more preferably from 0.1 mol % to 15 mol %, particularly preferably from 0.1 mol % to 10 mol % in ordinary cases.

In addition, the EVOH (A) to be used in the present disclosure may be a mixture with any other EVOH different therefrom, and examples of the other EVOH may include an EVOH different from the EVOH (A) in content of the ethylene structural unit, an EVOH different therefrom in content of the 1,2-diol structural unit represented by the general formula (1), an EVOH different therefrom in saponification degree, an EVOH different therefrom in melt flow rate (MFR), and an EVOH having a copolymerizable component other than ethylene and the vinyl ester monomer different from that of the EVOH (A).

In the present disclosure, the fatty acid metal salts are incorporated into the resin composition, and the fatty acid metal salts are at least two selected from the fatty acid metal salt having 3 to 12 carbon atoms (B), the fatty acid metal salt having 13 to 20 carbon atoms (C), and the fatty acid metal salt having 21 to 29 carbon atoms (D).

<(B) Fatty Acid Metal Salt having 3 to 12 Carbon Atoms>

Examples of the fatty acid metal salt having 3 to 12 carbon atoms (B) to be used in the present disclosure may include salts (e.g., alkali metal salts, such as a sodium salt and a potassium salt, alkaline earth metal salts, such as a magnesium salt, a calcium salt, and a barium salt, and transition metal salts, such as a zinc salt) of fatty acids, such as butyric acid, caproic acid, caprylic acid, pelargonic acid, capric acid, undecanoic acid, and lauric acid. Of those, fatty acid zinc salts (e.g., zinc butyrate, zinc caproate, zinc caprylate, zinc pelargonate, zinc caprate, zinc undecanoate, and zinc laurate) are suitably used because the effects of the present disclosure can be more easily obtained, and zinc laurate is particularly suitably used from the viewpoints of thermal stability and cost.

The content of the fatty acid metal salt having 3 to 12 carbon atoms (B) is typically from 0.0005 parts by weight to 0.0345 parts by weight, preferably from 0.0007 parts by weight to 0.025 parts by weight, more preferably from 0.001 parts by weight to 0.02 parts by weight with respect to 100 parts by weight of the EVOH (A) in terms of a metal. When such content is too small, the effects of the present disclosure are insufficient, and when the content is excessively large, the thermal stability and color tone stability of the resin composition tend to be reduced.

<(C) Fatty Acid Metal Salt having 13 to 20 Carbon Atoms>

Examples of the fatty acid metal salt having 13 to 20 carbon atoms (C) to be used in the present disclosure may include salts (e.g., alkali metal salts, such as a sodium salt and a potassium salt, alkaline earth metal salts, such as a magnesium salt, a calcium salt, and a barium salt, and transition metal salts, such as a zinc salt) of fatty acids, such as myristic acid, palmitic acid, stearic acid, 12-hydroxystearic acid, and arachidic acid. Of those, fatty acid zinc salts (e.g., zinc myristate, zinc palmitate, zinc stearate, zinc 12-hydroxystearate, and zinc arachidate), fatty acid magnesium salts (magnesiummyristate, magnesiumpalmitate, magnesium stearate, magnesium 12-hydroxystearate, and magnesium arachidate), and fatty acid calcium salts (calcium myristate, calcium palmitate, calcium stearate, calcium 12-hydroxystearate, and calcium arachidate) are suitably used because the effects of the present disclosure can be more easily obtained, and zinc stearate, magnesium stearate, and calcium stearate are particularly suitably used from the viewpoints of availability and cost.

The content of the fatty acid metal salt having 13 to 20 carbon atoms (C) is typically from 0.0005 parts by weight to 0.0345 parts by weight, preferably from 0.0007 parts by weight to 0.025 parts by weight, more preferably from 0.001 parts by weight to 0.02 parts by weight with respect to 100 parts by weight of the EVOH (A) in terms of a metal. When such content is too small, the effects of the present disclosure are insufficient, and when the content is excessively large, the thermal stability and color tone stability of the resin composition tend to be reduced.

<(D) Fatty Acid Metal Salt having 21 to 29 Carbon Atoms>

Examples of the fatty acid metal salt having 21 to 29 carbon atoms (D) to be used in the present disclosure may include salts (e.g., alkali metal salts, such as a sodium salt and a potassium salt, alkaline earth metal salts, such as a magnesium salt, a calcium salt, and a barium salt, and transition metal salts, such as a zinc salt) of fatty acids, such as behenic acid, lignoceric acid, cerotic acid, and montanic acid. Of those, fatty acid zinc salts (e.g., zinc behenate, zinc lignocerate, zinc cerotate, and zinc montanate) are suitably used because the effects of the present disclosure can be more easily obtained, and zinc behenate is particularly suitably used from the viewpoints of availability and cost.

The content of the fatty acid metal salt having 21 to 29 carbon atoms (D) is typically from 0.0005 parts by weight to 0.0345 parts by weight, preferably from 0.0007 parts by weight to 0.025 parts by weight, more preferably from 0.001 parts by weight to 0.02 parts by weight with respect to 100 parts by weight of the EVOH (A) in terms of a metal. When such content is too small, the effects of the present disclosure are insufficient, and when the content is excessively large, the thermal stability and color tone stability of the resin composition tend to be reduced.

<Content of Fatty Acid Metal Salts with Respect to EVOH (A)>

The total content (B+C+D) of the fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) to be used in the present disclosure is typically from 0.0005 parts by weight to 0.06 parts by weight, preferably from 0.0007 parts by weight to 0.05 parts by weight, more preferably from 0.001 parts by weight to 0.04 parts by weight with respect to 100 parts by weight of the EVOH (A) in terms of a metal. When such content is too small, the effects of the present disclosure are insufficient, and when the content is excessively large, the thermal stability and color tone stability of the resin composition tend to be reduced.

The resin composition of the present disclosure, which contains at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D), preferably contains the fatty acid metal salt having 3 to 12 carbon atoms (B) out of the fatty acid metal salts from the viewpoint that the effects of the present disclosure are easily obtained.

The ratio (B/C) of the content of the fatty acid metal salt having 3 to 12 carbon atoms (B) to the content of the fatty acid metal salt having 13 to 20 carbon atoms (C) is typically from 0.01 to 70, preferably from 0.5 to 35, more preferably from 1 to 20, particularly preferably from 1.1 to 10 in terms of a metal. When such ratio is too small, the effects of the present disclosure are insufficient, and when the ratio is excessively large, the thermal stability and color tone stability of the resin composition tend to be reduced.

The ratio (B/D) of the content of the fatty acid metal salt having 3 to 12 carbon atoms (B) to the content of the fatty acid metal salt having 21 to 29 carbon atoms (D) is typically from 0.01 to 70, preferably from 0.5 to 35, more preferably from 1 to 20, particularly preferably from 1.1 to 10 in terms of a metal. When such ratio is too small, the effects of the present disclosure are insufficient, and when the ratio is excessively large, the thermal stability and color tone stability of the resin composition tend to be reduced.

The ratio (B/(C+D)) of the content of the fatty acid metal salt having 3 to 12 carbon atoms (B) to the contents of the fatty acid metal salt having 13 to 20 carbon atoms (C) and the fatty acid metal salt having 21 to 29 carbon atoms (D) is typically from 0.01 to 70, preferably from 0.5 to 35, more preferably from 1 to 20, particularly preferably from 1.1 to 10 in terms of a metal. When such ratio is too small, the effects of the present disclosure are insufficient, and when the ratio is excessively large, the thermal stability and color tone stability of the resin composition tend to be reduced.

<Total Content of Zinc Salt with Respect to EVOH (A)>

The total content of the zinc salt of the resin composition of the present disclosure is typically from 0.0005 parts by weight to 0.035 parts by weight, preferably from 0.0007 parts by weight to 0.025 parts by weight, more preferably from 0.001 parts by weight to 0.02 parts by weight, still more preferably from 0.005 parts by weight to 0.017 parts by weight, particularly preferably from 0.008 parts by weight to 0.013 parts by weight with respect to 100 parts by weight of the EVOH (A) in terms of a metal. When such content is too small, the effects of the present disclosure are insufficient, and when the content is excessively large, the thermal stability and color tone stability of the resin composition tend to be reduced.

The total content of the zinc salt may be determined by, for example, a method involving: ashing the resin composition of the present disclosure; then dissolving the ashed product in an aqueous solution of hydrochloric acid; subjecting the solution to measurement with an inductively coupled plasma-atomic emission spectrometer (ICP-AES); and determining the content of the metal from the calibration curve of a standard liquid. In addition, the content of the EVOH (A) in the resin composition and the contents of the fatty acid metal salts therein may each be determined by, for example, high performance liquid chromatography.

In the present disclosure, it is sufficient that the fatty acid metal salts be at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D), and at least one of the fatty acid metal salts selected from the fatty acid metal salts (B), (C), and (D) be a zinc salt.

When at least one of the fatty acid metal salts selected from the fatty acid metal salts (B), (C), and (D) is a zinc salt, and at least one thereof is a magnesium salt or a calcium salt, the color tone deterioration of the resin composition at the time of its melt molding tends to be easily alleviated. In addition, when all the fatty acid metal salts selected from the fatty acid metal salts (B), (C), and (D) are zinc salts, the effects of the present disclosure tend to be more effectively obtained.

In the present disclosure, when at least one corresponding to the fatty acid metal salt having 3 to 12 carbon atoms (B), at least one corresponding to the fatty acid metal salt having 13 to 20 carbon atoms (C), and at least one corresponding to the fatty acid metal salt having 21 to 29 carbon atoms (D) are used as the fatty acid metal salts, and at least one of the fatty acid metal salts selected from the fatty acid metal salts (B), (C), and (D) is a zinc salt, the effects of the present disclosure tend to be more effectively obtained. All the fatty acid metal salts (B), (C), and (D) are preferably zinc salts.

<(E) Other Thermoplastic Resin>

The resin composition of the present disclosure may contain any other thermoplastic resin (E) as a resin component in addition to the EVOH (A) at a content typically in the range of 30 parts by weight or less with respect to 100 parts by weight of the EVOH (A).

Examples of the other thermoplastic resin (E) include the following thermoplastic resins: linear low-density polyethylene, low-density polyethylene, medium-density polyethylene, high-density polyethylene, an ethylene-vinyl acetate copolymer, an ionomer, an ethylene-propylene copolymer, an ethylene-α-olefin (α-olefin having 4 to 20 carbon atoms) copolymer, an ethylene-acrylate copolymer, polypropylene, a propylene-α-olefin (α-olefin having 4 to 20 carbon atoms) copolymer, a homopolymer or a copolymer of an olefin, such as polybutene or polypentene, a polycyclic olefin, or a polyolefin resin in a broad sense, such as a polyolefin resin obtained by graft-modifying such homopolymer or copolymer of an olefin with an unsaturated carboxylic acid or an ester thereof, a polystyrene resin, polyester, polyamide, copolymerized polyamide, polyvinyl chloride, polyvinylidene chloride, an acrylic resin, a vinyl ester resin, a polyester elastomer, a polyurethane elastomer, chlorinated polyethylene, and chlorinated polypropylene.

In particular, when a multilayer structure obtained by using the resin composition of the present disclosure is produced, and is used as a food packaging material, a polyamide resin is preferably blended for the purpose of preventing the elution of an EVOH layer in an end portion of the packaging material after the hot water treatment of the packaging material. An amide bond of the polyamide resin can form a network structure through an interaction with at least one of a OH group and an ester group of the EVOH, and hence the resin can prevent the elution of the EVOH layer at the time of the hot water treatment. Therefore, when the resin composition of the present disclosure is used as a packaging material for retort food or boiled food, the polyamide resin is preferably blended.

As the polyamide resin, known polyamide resins may be used.

Specific examples thereof include homopolymers, such as polycapramide (nylon 6), poly-ω-aminoheptanoic acid (nylon 7), poly-ω-aminononanoic acid (nylon 9), polyundecanamide (nylon 11), and polylauryllactam (nylon 12), and copolymerized polyamide resins, such as: aliphatic polyamides, such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), a caprolactam/lauryllactam copolymer (nylon 6/12), a cabrolactam/ω-aminononanoic acid copolymer (nylon 6/9), a caprolactam/hexamethylene diammonium adipate copolymer (nylon 6/66), a lauryllactam/hexamethylene diammonium adipate copolymer (nylon 12/66), an ethylenediamine adipamide/hexamethylene diammonium adipate copolymer (nylon 26/66), a caprolactam/hexamethylene diammonium adipate/hexamethylene diammonium sebacate copolymer (nylon 66/610), and an ethylene ammonium adipate/hexamethylene diammonium adipate/hexamethylene diammonium sebacate copolymer (nylon 6/66/610); aromatic polyamides, such as polyhexamethylene isophthalamide, polyhexamethylene terephthalamide, poly-m-xylylene adipamide, a hexamethylene isophthalamide/terephthalamide copolymer, poly-p-phenylene terephthalamide, and poly-p-phenylene-3,4'-diphenyl ether terephthalamide; amorphous polyamide; polyamide resins obtained by modifying those polyamide resins with an aromatic amine, such as methylenebenzylamine or m-xylenediamine; and m-xylylene diammonium adipate. Alternatively, terminal-modified polyamide resins thereof may be used. Of those, a terminal-modified polyamide resin is preferred.

The terminal-modified polyamide resin is specifically, for example, a terminal-modified polyamide resin modified with a hydrocarbon group having 1 to 22 carbon atoms, and a commercial product may be used. In more detail, for example, a terminal-modified polyamide resin having the following feature is preferably used: the number [X] of terminal COOH groups of the terminal-modified polyamide resin and the number [Y] of terminal $CONR^1R^2$ groups (where $R^1$ represents a hydrocarbon group having 1 to 22 carbon atoms, and $R^2$ represents a hydrogen atom or a hydrocarbon group having 1 to 22 carbon atoms) thereof satisfy a relationship of $100 \times Y/(X+Y) \geq 5$.

The terminal-modified polyamide resin is obtained by subjecting a carboxyl group of a typical unmodified polyamide resin to N-substituted amide modification with a terminal adjuster, and is such a polyamide resin that 5% or more of the total number of the carboxyl groups that the polyamide resin before the modification has contained are modified. When such modification amount is too small, the following tendency is observed: many carboxyl groups are present in the polyamide resin, and hence such carboxyl groups react with the EVOH at the time of the melt molding of the resin composition to produce gel or the like, which is liable to make the appearance of the resultant film unsatisfactory. Such terminal-modified polyamide resin may be produced by, for example, a method described in JP-B-HEI8 (1996)-19302.

When the polyamide resin is used as the other thermoplastic resin (E), a content ratio "EVOH/polyamide resin" is typically from 99/1 to 70/30, preferably from 97/3 to 75/25, particularly preferably from 95/5 to 85/15 in terms of a weight ratio. When the weight ratio of the polyamide resin is excessively large, the long-run moldability and gas barrier property of the resin composition tend to be reduced. When the weight ratio of the polyamide resin is too small, the suppressing effect of the resin on the elution of the EVOH layer at the time of the hot water treatment tends to be reduced.

<(F) Inorganic Filler>

In addition to the EVOH (A) (and as desired, the other thermoplastic resin (E)), the resin composition of the present disclosure may further contain an inorganic filler (F) as well as the at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) for the purpose of improving its gas barrier property.

The inorganic filler (F) is preferably a plate-like inorganic filler because the gas barrier property is further exhibited, and examples thereof include: kaolin, which contains hydrous aluminum silicate as a main component and in which particles are of plate shapes; mica and smectite serving as layered silicate minerals; and talc formed of magnesium hydroxide and a silicate. Of those, the kaolin is preferably used. The kind of the kaolin is not particularly limited, and the kaolin may be or may not be calcined. However, calcined kaolin is preferred.

The blending of the inorganic filler (F) further improves the gas barrier property of the resin composition. Particularly when the plate-like inorganic filler is used, in the case of film molding, the plate-like surface of the plate-like inorganic filler is easily oriented in the surface direction of a film because the filler has a multilayer structure. Thus, the plate-like inorganic filler oriented in the surface direction is assumed to particularly contribute to oxygen blocking in a resin composition layer (e.g., a film).

The content of the inorganic filler (F) is typically from 1 parts by weight to 20 parts by weight, preferably from 3 parts by weight to 18 parts by weight, more preferably from 5 parts by weight to 15 parts by weight with respect to 100 parts by weight of the EVOH (A). When such content is too small, the gas barrier property-improving effect of the filler tends to reduce, and when the content is excessively large, the transparency of the resin composition tends to reduce.

<(G) Oxygen Absorber>

In addition to the EVOH (A) (and as desired, the other thermoplastic resin (E)), the resin composition of the present disclosure may further contain an oxygen absorber (G) as well as the at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) for the purpose of improving its gas barrier property after a hot water treatment (retort treatment).

The oxygen absorber (G) is a compound that captures oxygen more rapidly than contents to be packaged do. Specific examples thereof include an inorganic oxygen absorber, an organic oxygen absorber, and a composite oxygen absorber in which an inorganic catalyst (transition metal catalyst) and an organic compound are used in combination.

Examples of the inorganic oxygen absorber include a metal and a metal compound, and these materials each react with oxygen to absorb the oxygen. A metal having an ionization tendency larger than that of hydrogen (e.g., Fe, Zn, Mg, Al, K, Ca, Ni, or Sn) is preferred as the metal, and iron is typically used. Those metals are each preferably used in a powder state. Any one of the conventionally known iron powders obtained by, for example, arbitrary production methods, such as a reduced iron powder, an atomized iron powder, and an electrolytic iron powder, may be used as an iron powder without any particular limitation. In addition, iron to be used may be a product obtained by subjecting iron that has been oxidized once to a reduction treatment. In addition, an oxygen-deficient metal compound is preferred as the metal compound. Here, examples of the oxygen-deficient metal compound include cerium oxide ($CeO_2$), titanium oxide ($TiO_2$), and zinc oxide (ZnO). Oxygen is drawn from the crystal lattice of each of those oxides by a reduction treatment to bring the oxide into an oxygen-deficient state, and the resultant reacts with oxygen in an atmosphere to exhibit an oxygen-absorbing ability. Such metals and metal compounds each preferably contain, for example, a metal halide as a reaction accelerator.

Examples of the organic oxygen absorber include a hydroxy group-containing compound, a quinone compound, a double bond-containing compound, and an oxidizable resin. Oxygen reacts with a hydroxy group or a double bond in any such material, and hence the oxygen can be absorbed. For example, ring-opening polymers of cycloalkenes, such as polyoctenylene, and a polymer of a conjugated diene, such as butadiene, and a cyclized product thereof are each preferred as the organic oxygen absorber.

The content of such oxygen absorber (G) is typically from 1 parts by weight to 30 parts by weight, preferably from 3 parts by weight to 25 parts by weight, more preferably from 5 parts by weight to 20 parts by weight with respect to 100 parts by weight of the EVOH (A).

<(H) Other Additive>

In the resin composition of the present disclosure, in addition to the above-mentioned various components, the following known additives may be appropriately blended as required, to the extent that the effects of the present disclosure are not impaired (e.g., 5 wt % or less of the entirety of the resin composition): plasticizers, such as an aliphatic polyhydric alcohol, such as ethylene glycol, glycerin, or hexanediol; higher fatty acids (e.g., lauric acid, myristic acid, palmitic acid, stearic acid, behenic acid, and oleic acid), higher fatty acid esters (e.g., a methyl ester, an isopropyl ester, a butyl ester, or an octyl ester of a higher fatty acid), higher fatty acid amides (saturated aliphatic amides, such as stearamide and behenamide, unsaturated fatty acid amides, such as oleamide and erucamide, and bisfatty acid amides, such as ethylenebisstearamide, ethylenebisoleamide, ethylenebiserucamide, and ethylenebislauramide), low-molecular-weight polyolefins (e.g., low-molecular-weight polyethylene or low-molecular-weight polypropylene having a molecular weight of from about 500 to about 10,000); lubricants, such as an ethylene fluoride resin; antiblocking agents; antioxidants; colorants; antistatic agents; antimicrobials; insoluble inorganic salts (e.g., hydrotalcite); surfactants; conjugated polyene compounds; and the like.

A base resin in the entirety of the resin composition of the present disclosure is the EVOH (A). Therefore, the amount of the EVOH (A) is typically 70 wt. % or more, preferably 80 wt. % or more, particularly preferably 90 wt. % or more with respect to the entirety of the resin composition. When such amount is excessively large, an effect of blending the component (B), (C), (D), (E), (F), (G), or (H) (including a case in which the components are used in combination) tends to reduce, and when the amount is too small, the gas barrier property of the resin composition tends to reduce.

<Method of producing Resin Composition>

A method of producing the resin composition of the present disclosure is not particularly limited, and in short, the at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) only need to be caused to exist in at least one of the following portions: in the resin composition; and on the external surface of the resin composition.

"Method of causing Fatty Acid Metal Salts to exist in Resin Composition"

Specific examples of a method of causing the at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) to exist in the resin composition may include:

(I) a method involving collectively mixing the EVOH (A) and the fatty acid metal salts, and then melting and kneading the mixture;

(II) a method involving melting and kneading the EVOH (A) and part of the fatty acid metal salts, then adding the other fatty acid metal salt to the resultant, and further melting and kneading the mixture;

(III) a method involving incorporating part of the fatty acid metal salts into the EVOH (A), then adding the other fatty acid metal salt to the resultant, and melting and kneading the mixture;

(IV) a method involving collectively mixing the fatty acid metal salts, then adding the EVOH (A) to the mixture, and melting and kneading the whole; and (V) a method involving uniformly dissolving the EVOH (A) and the fatty acid metal salts in a solvent capable of dissolving the materials, mixing the contents, and then removing the solvent.

The methods (I) to (IV) are industrially suitably used. Such methods are described in more detail, but the present disclosure is not limited thereto.

When the three fatty acid metal salts (B), (C), and (D) are used, the phrase "part of the fatty acid metal salts" means one or two of the fatty acid metal salts (e.g., the fatty acid metal salt (B) or the fatty acid metal salts (B) and (C)), and when two of the fatty acid metal salts are used, the phrase means one of the fatty acid metal salts (e.g., the fatty acid metal salt (C)).

With regard to a method for the melt kneading in each of the methods (I) to (IV), the melt kneading may be performed by using a known melt kneading apparatus, such as a kneader-ruder, an extruder, a mixing roll, a Banbury mixer, or a plastomill, as means for the melt kneading. In ordinary cases, the melt kneading is preferably performed at from 150° C. to 300° C. (more preferably from 180° C. to 280° C.) for from about 1 minute to about 20 minutes. In particular, the use of a single-screw or twin-screw extruder is industrially advantageous because a pellet is easily obtained. In addition, a vent suction apparatus, a gear pump apparatus, a screen apparatus, or the like is preferably arranged as required. In particular, a resin composition alleviated in thermal coloration and thermal deterioration, and excellent in quality can be obtained by arranging one or more vent holes in an extruder to perform suction under reduced pressure for removing moisture and a by-product (e.g., a thermally decomposed low-molecular weight product) or by continuously supplying an inert gas, such as nitrogen, into a hopper for preventing the inclusion of oxygen into the extruder.

In addition, a method of supplying the EVOH (A) and the fatty acid metal salts to the melt kneading apparatus, such as an extruder, is not particularly limited, and examples thereof may include:

(i) a method involving dry-blending the EVOH (A) and the fatty acid metal salts, and collectively supplying the blend to the extruder;

(ii) a method involving supplying the EVOH (A) to the extruder, melting the EVOH, and supplying the fatty acid metal salts in solid states to the molten EVOH (solid side-feed method); and (iii) a method involving supplying the EVOH (A) to the extruder, melting the EVOH, and supplying the fatty acid metal salts in molten states to the molten EVOH (melt side-feed method).

Of those, the method (i) is practical in terms of, for example, the simplicity of the apparatus and cost for the blend.

Next, the method (III) is described.

At the time of the incorporation of the fatty acid metal salts into the EVOH (A) in the method (III), for example, the following methods may each be used:

(a) a method involving melting and kneading the EVOH (A) and the fatty acid metal salts with the above-mentioned extruder or the like;

(b) a method involving adding the fatty acid metal salts to a solution containing the EVOH (A), mixing the contents, and then removing a solvent in the solution; and (c) a method involving loading the EVOH (A) into a solution containing the fatty acid metal salts to impregnate the EVOH with the solution, and then drying the resultant.

Of those, the methods (b) and (c) are preferred because the dispersibility of the fatty acid metal salts is excellent.

Although a melt-molded article of the resin composition obtained by any one of the methods (I) to (V) may be directly obtained after the melt kneading of the raw materials therefor, in terms of industrial handleability, the melt-molded article is preferably obtained by producing a pellet made of the resin composition after the melt kneading and subjecting the pellet to a melt molding method. A method involving melting and kneading the raw materials with an extruder, extruding the resultant into the shape of a strand, and cutting the strand to pelletize the strand is preferred in terms of cost efficiency.

Examples of the shape of the pellet include a spherical shape, a columnar shape, a cubic shape, and a rectangular parallelepiped shape. However, the pellet is typically of an oval shape or a columnar shape, and its size is as follows from the viewpoint of convenience when the pellet is used later as a molding material: when the pellet is of a spherical shape, its diameter is typically from 1 mm to 6 mm, preferably from 2 mm to 5 mm, and its height is typically from 1 mm to 6 mm, preferably from 2 mm to 5 mm; and when the pellet is of a columnar shape, the diameter of its bottom surface is typically from 1 mm to 6 mm, preferably from 2 mm to 5 mm, and its length is typically from 1 mm to 6 mm, preferably from 2 mm to 5 mm.

The water content of the resin composition or the pellet is preferably set to from 0.001 wt. % to 5 wt. % (more preferably from 0.01 wt. % to 2 wt. %, particularly preferably from 0.1 wt. % to 1 wt. %). When the water content is too low, the long-run moldability of the resin composition tends to reduce. In contrast, when the water content is excessively high, the foaming thereof tends to occur at the time of its extrusion molding.

The water content of the resin composition pellet as used herein is measured and calculated by the following method.

[Method of measuring Water Content]

The resin composition pellet is weighed (W1: unit: g) in an electronic balance. After that, the pellet is loaded into a hot-air oven-type dryer maintained at 150° C. and dried for 5 hours. Then, the pellet is further left to cool in a desiccator for 30 minutes. Its weight after the cooling is similarly weighed (W2: unit: g), and the water content is calculated from the following equation (1).

[Eq. 1]

$$\text{Water content (\%)} = \{(W1-W2)/W1\} \times 100 \qquad (1)$$

"Method of causing Fatty Acid Metal Salts to exist on External Surface of Resin Composition"

Next, specific examples of a method of causing the at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D) to exist on the external surface of the resin composition may include:

(1) a method involving blending the EVOH (A) having a water content of from 0.1 wt. % to 5 wt. % with the fatty acid metal salts;

(2) a method involving blending the EVOH (A) that has been heated with the fatty acid metal salts that have been melted;

(3) a method involving blending the EVOH (A) mixed with a small amount of a silicone oil or the like with the fatty acid metal salts;

(4) a method involving blending the EVOH (A) into which a liquid plasticizer, such as glycerin, has been incorporated with the fatty acid metal salts; and (5) a method involving blending the EVOH (A) with the fatty acid metal salts dissolved in a small amount of a solvent.

The method (1) is industrially suitably adopted. Such method is described more specifically, but the present disclosure is not limited thereto.

When the fatty acid metal salts are caused to adhere to the surface of the resin composition, in order that the adhesive properties of the fatty acid metal salts may be improved, such water content of the pellet is preferably adjusted to from 0.1 wt. % to 5 wt. % (more preferably from 0.5 wt. % to 4 wt. %, particularly preferably from 1 wt. % to 3 wt. %). When such water content is less than 0.1 wt. %, the fatty acid metal salts are liable to fall, and hence their adhesion (attachment) distribution tends to be nonuniform. In contrast, when the water content is more than 5 wt. %, the fatty acid metal salts agglomerate, and hence the adhesion (attachment) distribution tends to be nonuniform also at this time.

In addition, at the time of the blending, the fatty acid metal salts may be caused to adhere to the surface with a known mixing apparatus, such as a rocking mixer, a ribbon blender, or a line mixer.

<Multilayer Structure>

When a layer formed of the resin composition of the present disclosure (hereinafter simply referred to as "resin composition layer") is laminated on any other substrate, the layer can further improve the strength of the substrate or impart any other function to the substrate.

A layer formed of an adhesive resin (hereinafter simply referred to as "adhesive resin layer"), a layer formed of a polyamide resin (hereinafter simply referred to as "polyamide layer"), or a layer formed of a thermoplastic resin other than the EVOH (hereinafter simply referred to as "thermoplastic resin layer") is preferably used as the substrate.

When the resin composition layer of the present disclosure is represented by α (α1, α2, . . . ), the adhesive resin layer thereof is represented by β (β1, β2, . . . ), the polyamide layer thereof is represented by γ (γ1, 65 2, . . . ), and the other thermoplastic resin layer thereof is represented by δ (δ1, δ2, . . . ), for example, the following arbitrary combinations may each be adopted as the layer construction of a multilayer structure: α/β/67; α1/β/α2; δ1/β/α/δ2; δ/α1/β/α2; δ1/β1/α/β2/δ2; δ1/α1/62/α2/β2; δ1/β1/60 1/β2/α2/β3/β2; γ1/α/γ2; γ/α/β; δ/α/β/δ; α1/β/α2/γ; δ1/β/α/γ/δ2; δ/α1/β/E2/γ; δ1/β1/α/γ/β2/δ2; δ1/β1/γ1/α/γ2/β2/δ2; δ1/α1/β/α2/γ/δ2; and δ1/β1/α1/γ1/β2/α2/γ2/β3/δ2. In addition, when a recycled layer containing a mixture of the resin composition, adhesive resin, polyamide resin, and thermoplastic resin of the present disclosure, the layer being obtained by recovering an end portion, a defective product, and the like produced in a process for the production of the multilayer structure, and melting and molding the recovered materials again, is represented by R (R1, R2, . . . ), for example, the following combinations may each be adopted: δ/R/β/α; δ/R/α1/β/α2; δ1/R/α/β/δ2; R1/α1/β/α2/R2; δ1/R1/β1/α/β2/R2/δ2; δ1/R1/α1/β/α2/R2/δ2; δ/R/β/α/γ; δ/R/γ/α1/β/α2;

δ1/R/γ/α/β/δ2; R1/γ/α1/β/α2/R2; δ1/R1/β1/γ/α/β2/R2/δ2; and δ1/R1/γ1/α1/β/α2/γ2/R2/δ2.

As the polyamide resin, known polyamide resins may be used. Specific examples thereof include homopolymers, such as polycapramide (nylon 6), poly-w-aminoheptanoic acid (nylon 7), poly-ω-aminononanoic acid (nylon 9), poly-undecanamide (nylon 11), and polylauryllactam (nylon 12), and copolymerized polyamide resins, such as: aliphatic polyamides, such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), a caprolactam/lauryllactam copolymer (nylon 6/12), a caprolactam/w-aminononanoic acid copolymer (nylon 6/9), a caprolactam/hexamethylene diammonium adipate copolymer (nylon 6/66), a lauryllactam/hexamethylene diammonium adipate copolymer (nylon 12/66), an ethylenediamine adipamide/hexamethylene diammonium adipate copolymer (nylon 26/66), a caprolactam/hexamethylene diammonium adipate/hexamethylene diammonium sebacate copolymer (nylon 66/610), and an ethylene ammonium adipate/hexamethylene diammonium adipate/hexamethylene diammonium sebacate copolymer (nylon 6/66/610); aromatic polyamides, such as polyhexamethylene isophthalamide, polyhexamethylene terephthalamide, poly-m-xylylene adipamide, a hexamethylene isophthalamide/terephthalamide copolymer, poly-p-phenylene terephthalamide, and poly-p-phenylene-3,4'-diphenyl ether terephthalamide; amorphous polyamide; polyamide resins obtained by modifying those polyamide resins with an aromatic amine, such as methylenebenzylamine or m-xylenediamine; and m-xylylene diammonium adipate. Alternatively, terminal-modified polyamide resins thereof may be used. Of those, a terminal-modified polyamide resin is preferred.

Examples of the other thermoplastic resin include: (unmodified) polyolefin resins, such as polyethylene resins, for example, linear low-density polyethylene, low-density polyethylene, ultralow-density polyethylene, medium-density polyethylene, high-density polyethylene, ethylene-propylene (block and random) copolymers, and an ethylene-α-olefin (α-olefin having 4 to 20 carbon atoms) copolymer, polypropylene resins, for example, polypropylene and a propylene-α-olefin (α-olefin having 4 to 20 carbon atoms) copolymer, polybutene, polypentene, and a polycyclic olefin resin (a polymer having a cyclic olefin structure in a main chain and/or a side chain); polyolefin resins in a broad sense including modified olefin resins, such as unsaturated carboxylic acid-modified polyolefin resins obtained by graft-modifying those polyolefins with an unsaturated carboxylic acid or an ester thereof; an ionomer; an ethylene-vinyl acetate copolymer; an ethylene-acrylic acid copolymer; an ethylene-acrylate copolymer; a polyester resin; polyvinyl chloride; polyvinylidene chloride; an acrylic resin; a polystyrene resin; a vinyl ester resin; a polyester elastomer; a polyurethane elastomer; halogenated polyolefins, such as chlorinated polyethylene and chlorinated polypropylene; and aromatic or aliphatic polyketones.

Of those, in consideration of hydrophobicity, a polyolefin resin, a polyester resin, and a polystyrene resin each serving as a hydrophobic resin are preferred, polyolefin resins, such as a polyethylene resin, a polypropylene resin, and a polycyclic olefin resin, and unsaturated carboxylic acid-modified polyolefin resins thereof are more preferred, and a polycyclic olefin resin is particularly preferably used as the hydrophobic resin.

In addition, a known resin may be used as the adhesive resin serving as a forming material for the adhesive resin layer, and only needs to be appropriately selected in accordance with the kind of the thermoplastic resin to be used as the other thermoplastic resin layer serving as the substrate. A typical example thereof may be a carboxyl group-containing modified polyolefin polymer obtained by chemically bonding an unsaturated carboxylic acid or an anhydride thereof to a polyolefin resin through an addition reaction, a graft reaction, or the like. Examples thereof include maleic acid anhydride-graft-modified polyethylene, maleic acid anhydride-graft-modified polypropylene, maleic acid anhydride-graft-modified ethylene-propylene (block and random) copolymers, a maleic acid anhydride-graft-modified ethylene-ethyl acrylate copolymer, a maleic acid anhydride-graft-modified ethylene-vinyl acetate copolymer, a maleic acid anhydride-modified polycyclic olefin resin, and a maleic acid anhydride-graft-modified polyolefin resin. Those polymers may be used alone or in combination thereof.

The other thermoplastic resin layer (substrate resin) or the adhesive resin layer may contain a conventionally known plasticizer, filler, clay (e.g., montmorillonite), colorant, antioxidant, antistatic agent, lubricant, nucleating agent, antiblocking agent, UV absorber, wax, or the like to the extent that the spirit of the present disclosure is not inhibited (e.g., at a content of 30 wt. % or less, preferably 10 wt. % or less).

Lamination in the case where the multilayer structure is produced by laminating the resin composition of the present disclosure together with the substrate may be performed by a known method. Examples thereof include: a method involving melting and extruding the other substrate, and laminating the resultant on a film, sheet, or the like of the resin composition of the present disclosure; a method involving, in contrast to the foregoing, melting and extruding the resin composition of the present disclosure, and laminating the resultant on the other substrate; a method involving subjecting the resin composition of the present disclosure and the other substrate to coextrusion molding; a method involving producing each of a film (layer) formed of the resin composition of the present disclosure and the other substrate (layer), and subjecting the products to dry lamination with a known adhesive, such as an organotitanium compound, an isocyanate compound, a polyester compound, or a polyurethane compound; and a method involving applying a solution of the resin composition of the present disclosure onto the other substrate, and then removing a solvent. Of those, the method involving the coextrusion molding is preferred in consideration of cost and environmental viewpoints.

Next, the multilayer structure is subjected to a (heat) stretching treatment as required. The stretching treatment may be any one of uniaxial stretching and biaxial stretching. In the case of the biaxial stretching, any one of simultaneous stretching and sequential stretching is permitted. In addition, a method providing a high stretching ratio out of, for example, a roll stretching method, a tenter stretching method, a tubular stretching method, a stretching blow method, and vacuum-pressure molding may be adopted as a stretching method. A stretching temperature is selected from the range of typically from 40° C. to 170° C., preferably from about 60° C. to about 160° C. When the stretching temperature is too low, the stretchability of the multilayer structure becomes unsatisfactory, and when the stretching temperature is excessively high, it becomes difficult for the multilayer structure to maintain a stable stretched state.

Next, thermal fixing may be performed for the purpose of imparting dimensional stability to the multilayer structure after the stretching. The thermal fixing may be performed by well-known means and for example, the stretched multilayer structure (stretched film) is subjected to a heat treatment at typically from 80° C. to 180° C., preferably from 100° C. to 165° C. for typically from about 2 seconds to about 600 seconds while its tense state is kept.

In addition, when a multilayer stretched film obtained by using the resin composition of the present disclosure is used as a shrinking film, in order that heat shrinkability may be imparted thereto, a treatment involving, for example, applying cold air to the film after the stretching to cool and fix the film is desirably performed without the performance of the thermal fixing.

Further, in some cases, a multilayer container of a cup or tray shape may be obtained from the multilayer structure of the present disclosure. A drawing method is typically adopted as a method of producing the multilayer container, and specific examples thereof include a vacuum molding method, a pressure molding method, a vacuum-pressure molding method, and a plug-assisted vacuum-pressure molding method. Further, when a multilayer container of a tube or bottle shape is obtained from a multilayer parison (preliminarily molded product of a hollow tube shape before blowing), a blow molding method is adopted, and specific examples thereof include an extrusion blow molding method (of, for example, a twin-head type, a mold-transfer type, a parison shift type, a rotary type, an accumulator type, or a horizontal parison type), a cold parison-type blow molding method, an injection blow molding method, and a biaxial stretching blow molding method (e.g., an extrusion-type cold parison biaxial stretching blow molding method, an injection-type cold parison biaxial stretching blow molding method, or an injection molding in-line-type biaxial stretching blow molding method). The multilayer structure of the present disclosure may be subjected to, for example, a heat treatment, a cooling treatment, a rolling treatment, a printing treatment, a dry lamination treatment, a solution or melt coating treatment, bag-making processing, deep drawing processing, box processing, tube processing, or split processing as required.

The thickness of the multilayer structure (including a stretched multilayer structure) of the present disclosure, and the thicknesses of the resin composition layer, the polyamide layer, the adhesive resin layer, and the other thermoplastic resin layer forming the multilayer structure are appropriately set in accordance with, for example, the layer construction of the multilayer structure, the kind of the thermoplastic resin, the kind of the polyamide resin, the kind of the adhesive resin, the applications and packaging form of the multilayer structure, and physical properties that the multilayer structure is required to have. When two or more layers of at least one kind selected from the resin composition layer, the adhesive resin layer, and the other thermoplastic resin layer are present, the following numerical values are each a value obtained by totaling the thicknesses of the layers of the same kind.

The total thickness of the multilayer structure (including the stretched multilayer structure) of the present disclosure is typically from 10 µm to 5,000 µm, preferably from 30 µm to 3,000 µm, particularly preferably from 50 µm to 2,000 µm. When the total thickness of the multilayer structure is too small, its gas barrier property may be reduced. In addition, when the total thickness of the multilayer structure is excessively large, economical efficiency tends to be low because an unnecessary amount of raw material is used. In addition, the thickness of the resin composition layer is typically from 1 µm to 500 µm, preferably from 3 µm to 300 µm, particularly preferably from 5 µm to 200 µm, the thickness of the other thermoplastic resin layer is typically from 5 µm to 3,000 µm, preferably from 10 µm to 2,000 µm, particularly preferably from 20 µm to 1,000 µm, and the thickness of the adhesive resin layer is typically from 0.5 µm to 250 µm, preferably from 1 µm to 150 µm, particularly preferably from 3 µm to 100 µm.

Further, the thickness ratio (resin composition layer/other thermoplastic resin layer) of the resin composition layer in the multilayer structure to the other thermoplastic resin layer therein is as follows: when two or more layers of each kind are present, the ratio is typically from 1/99 to 50/50, preferably from 5/95 to 45/55, particularly preferably from 10/90 to 40/60 in terms of a ratio between the layers each having the largest thickness among the layers of the same kind. In addition, the thickness ratio (resin composition layer/polyamide layer) of the resin composition layer in the multilayer structure to the polyamide layer therein is as follows: when two or more layers of each kind are present, the ratio is typically from 10/90 to 99/1, preferably from 20/80 to 80/20, particularly preferably from 40/60 to 60/40 in terms of a ratio between the layers each having the largest thickness among the layers of the same kind. In addition, the thickness ratio (resin composition layer/adhesive resin layer) of the resin composition layer in the multilayer structure to the adhesive resin layer therein is as follows: when two or more layers of each kind are present, the ratio is typically from 10/90 to 99/1, preferably from 20/80 to 95/5, particularly preferably from 50/50 to 90/10 in terms of a ratio between the layers each having the largest thickness among the layers of the same kind.

A bag formed of the film or the stretched film obtained as described above, and a container or a lid material formed of a cup, a tray, a tube, a bottle, or the like obtained as described above are useful as containers not only for general food but also for various materials to be packaged, such as seasonings including mayonnaise and a dressing, fermented food including a soybean paste, oil and fat food including a salad oil, beverages, cosmetics, and drugs.

Of those, the multilayer structure including the layer formed of the resin composition of the present disclosure is alleviated in color tone deterioration at the time of its melt molding, and is suppressed in occurrence of an appearance failure, in particular, a reduction in image clarity. This is probably because minute interface roughening that may cause the appearance failure is reduced at at least one of a lamination interface between the resin composition layer and adhesive resin layer of the multilayer structure, and a lamination interface between the resin composition layer and polyamide layer thereof. The multilayer structure is useful as a container for various materials, such as: general food; seasonings including mayonnaise and a dressing; fermented food including a soybean paste; oil and fat food including a salad oil; soups; beverages; cosmetics; drugs; detergents; perfumeries; industrial chemicals; agricultural chemicals; and fuels. The multilayer structure is particularly useful as a packaging material for, for example: a bottle-shaped container or a tubular container for semisolid food or seasonings, such as mayonnaise, ketchup, sauce, a soybean paste, green horseradish paste, mustard, and sauce for broiled meat or the like, or liquid beverages or seasonings, such as a salad oil, sweet cooking rice wine, refined sake, beer, wine, juice, black tea, sports drink, mineral water, and milk; a cupped container for semisolid food or seasonings, such as fruit, jelly, pudding, yogurt, mayonnaise, a soybean paste, processed rice, ready-cooked food, and a soup; or a wide-mouth container for raw meat, an animal meat-processed product (e.g., ham, bacon, or sausage), cooked rice, or pet food.

EXAMPLES

The present disclosure is more specifically described below by way of Examples, but the present disclosure is not limited to the following Examples without departing from the gist of the present disclosure. In Examples, "parts" is by weight.

Example 1

<Production of Resin Composition>

A pellet of an EVOH (a1) (ethylene structural unit content: 38 mol %, saponification degree: 99.6 mol %, MFR: 4.2 g/10 min (210° C., load: 2,160 g)) was used as the EVOH (A). 0.0017 Part of zinc laurate (b1) with respect to 100 parts of the EVOH (a1) in terms of a metal was used as the fatty acid metal salt having 3 to 12 carbon atoms (B). 0.0012 Part of zinc stearate (c1) with respect to 100 parts of the EVOH (a1) in terms of a metal was used as the fatty acid metal salt having 13 to 20 carbon atoms (C). 0.0011 Part of zinc behenate (d1) with respect to 100 parts of the EVOH (a1) in terms of a metal was used as the fatty acid metal salt having 21 to 29 carbon atoms (D) The pellet of the EVOH (a1), the zinc laurate (b1), the zinc stearate (c1), and the zinc behenate (d1) were collectively dry-blended, and then the blend was melted and kneaded with a 20 mmφ twin-screw extrusion molding apparatus (L/D=25) to be pelletized again. Thus, the resin composition of the present disclosure was prepared.

<Production of Multilayer Structure>

The resin composition prepared in the foregoing, linear low-density polyethylene (LLDPE) ("UF240" manufactured by Japan Polyethylene Corporation, MFR: 2.1 g/10 min (190° C., load: 2,160 g)), and an adhesive resin ("PLEXAR PX3236" manufactured by Lyondell Basell Industries N.V., MFR: 2.0 g/10 min (190° C., load: 2,160 g)) were supplied to a three-kind and five-layer multilayer coextrusion cast film production apparatus, and were subjected to multilayer coextrusion molding under the following conditions to provide a multilayer structure (film) of a three-kind and five-layer structure "LLDPE layer/adhesive resin layer/EVOH layer/adhesive resin layer/LLDPE layer." The thicknesses (μm) of the respective layers of the multilayer structure were 37.5/5/15/5/37.5. All the die temperatures of molding apparatus were set to 210° C.

(Multilayer Coextrusion Molding Conditions)
Intermediate layer extruder (EVOH): 40 mmφ single-screw extruder (barrel temperature: 210° C.)
Upper and lower layer extruder (LLDPE): 40 mmφ single-screw extruder (barrel temperature: 210° C.)
Medium upper and lower layer extruder (adhesive resin): 32 mmφ single-screw extruder (barrel temperature: 210° C.)
Die: three-kind and five-layer feed block-type T-die (die temperature: 210° C.)
Drawing speed: 14 m/min
Roll temperature: 50° C.

<Appearance of Multilayer Structure>

The image clarity of the multilayer structure produced in the foregoing was measured by a transmission method in conformity with JIS K 7374 "Plastics-Determination of Image Clarity," and was defined as the result of the evaluation of the appearance of the multilayer structure on the basis of the following evaluation criteria. A film test piece was subjected to the measurement while the machine direction of the film was defined as a vertical direction. An image clarity-measuring device "Model ICM-1" manufactured by Suga Test Instruments Co., Ltd. was used as a measuring device. An optical comb having a width of 0.25 mm was used as an optical comb.

oo: Image clarity≥45%: The appearance of the multilayer structure is significantly satisfactory.
o: 10%≤image clarity<45%: The appearance of the multilayer structure is satisfactory.
x: Image clarity<10%: The appearance of the multilayer structure is poor.

<Evaluation of Color Tone Stability of Resin Composition>

5 Grams of the resin composition prepared in the foregoing was loaded into a 30 mmφ aluminum cup (DISPODISH PP-724 manufactured by AS ONE Corporation), and was subjected to a heating treatment under an air atmosphere at 210° C. for 2 hours to provide a sample. The sample was subjected to a color tone evaluation. The color tone evaluation was performed on the basis of the following apparatus and evaluation method.

Used instrument; VISUAL ANALYZER IRISVA400 (manufactured by Alpha M.O.S. Japan K.K.)
Data analysis software; Alpha Soft V14.3
Objective lens; 25 mm (manufactured by Basler AG)
Lighting mode; Upper and lower lighting
Measurement method; The sample for a color tone evaluation was set in a tray in the chamber of the VISUAL ANALYZER, and a plane image of the entirety of the sample for a color tone evaluation was photographed with a CCD camera. After that, the color pattern of the sample was evaluated by processing the image with the data analysis software. The color tone stability of the resin composition was evaluated from the lightness (L*) of a color having the highest abundance ratio among the resultant color pattern (main color) and the following evaluation criteria.

oo: L*≥55: There is substantially no difference between the color tones of the sample before and after the heating treatment.
o: 50≤L*<55: There is a slight difference between the color tones before and after the heating treatment.
x: L*<50: There is a large difference between the color tones before and after the heating treatment.

Example 2

A resin composition and a multilayer structure were each produced in the same manner as in Example 1 except that: 0.0025 part of the zinc laurate (b1) with respect to 100 parts of the EVOH (a1) in terms of the metal was used; 0.0025 part of the zinc stearate (c1) with respect to 100 parts of the EVOH (a1) in terms of the metal was used; and 0.0025 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 3

A resin composition and a multilayer structure were each produced in the same manner as in Example 1 except that: 0.00333 part of the zinc laurate (b1) with respect to 100 parts of the EVOH (a1) in terms of the metal was used; 0.00333 part of the zinc stearate (c1) with respect to 100 parts of the EVOH (a1) in terms of the metal was used; and 0.00333 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 4

A resin composition and a multilayer structure were each produced in the same manner as in Example 1 except that: 0.00167 part of the zinc laurate (b1) with respect to 100 parts of the EVOH (a1) in terms of the metal was used; 0.00167 part of the zinc stearate (c1) with respect to 100 parts of the EVOH (a1) in terms of the metal was used; and 0.00667 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 5

A resin composition and a multilayer structure were each produced in the same manner as in Example 1 except that: 0.00167 part of the zinc laurate (b1) with respect to 100 parts of the EVOH (a1) in terms of the metal was used; 0.00667 part of the zinc stearate (c1) with respect to 100 parts of the EVOH (a1) in terms of the metal was used; and 0.00167 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 6

A resin composition and a multilayer structure were each produced in the same manner as in Example 1 except that: 0.00667 part of the zinc laurate (b1) with respect to 100 parts of the EVOH (a1) in terms of the metal was used; 0.00167 part of the zinc stearate (c1) with respect to 100 parts of the EVOH (a1) in terms of the metal was used; and 0.00167 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 7

A resin composition and a multilayer structure were each produced in the same manner as in Example 1 except that: 0.005 part of the zinc laurate (b1) with respect to 100 parts of the EVOH (a1) in terms of the metal was used; 0.005 part of the zinc stearate (c1) with respect to 100 parts of the EVOH (a1) in terms of the metal was used; and 0.005 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 8

A resin composition and a multilayer structure were each produced in the same manner as in Example 1 except that: 0.005 part of the zinc laurate (b1) with respect to 100 parts of the EVOH (a1) in terms of the metal was used; 0.005 part of zinc 12-hydroxystearate (c2) with respect to 100 parts of the EVOH (a1) in terms of a metal was used as the fatty acid metal salt having 13 to 20 carbon atoms (C); 0.005 part of the zinc behenate (d1) with respect to 100 parts of the EVOH (a1) in terms of the metal was used; and the zinc stearate (c1) was not used. The appearance of the resultant multilayer structure and the color tone stability of the resin composition were each evaluated in the same manner as in Example 1.

Example 9

A resin composition and a multilayer structure were each produced in the same manner as in Example 1 except that: 0.01 part of the zinc laurate (b1) with respect to 100 parts of the EVOH (a1) in terms of the metal was used; 0.01 part of the zinc stearate (c1) with respect to 100 parts of the EVOH (a1) in terms of the metal was used; and 0.01 part of the zinc behenate (d1) with respect to 100 parts of the EVOH (a1) in terms of the metal was used. The appearance of the resultant multilayer structure and the color tone stability of the resin composition were each evaluated in the same manner as in Example 1.

Example 10

A resin composition and a multilayer structure were each produced in the same manner as in Example 1 except that: 0.005 part of the zinc laurate (b1) with respect to 100 parts of the EVOH (a1) in terms of the metal was used; 0.005 part of the zinc stearate (c1) with respect to 100 parts of the EVOH (a1) in terms of the metal was used; and the zinc behenate (d1) was not used. The appearance of the resultant multilayer structure and the color tone stability of the resin composition were each evaluated in the same manner as in Example 1.

Example 11

A resin composition and a multilayer structure were each produced in the same manner as in Example 1 except that: 0.005 part of the zinc laurate (b1) with respect to 100 parts of the EVOH (a1) in terms of the metal was used; 0.005 part of the zinc behenate (d1) with respect to 100 parts of the EVOH (a1) in terms of the metal was used; and the zinc stearate (c1) was not used. The appearance of the resultant multilayer structure and the color tone stability of the resin composition were each evaluated in the same manner as in Example 1.

Example 12

A resin composition and a multilayer structure were each produced in the same manner as in Example 1 except that: 0.005 part of the zinc stearate (c1) with respect to 100 parts of the EVOH (a1) in terms of the metal was used; 0.005 part of the zinc behenate (d1) with respect to 100 parts of the EVOH (a1) in terms of the metal was used; and the zinc laurate (b1) was not used. The appearance of the resultant multilayer structure and the color tone stability of the resin composition were each evaluated in the same manner as in Example 1.

Comparative Example 1

A resin composition and a multilayer structure were each produced in the same manner as in Example 1 except that: 0.01 part of the zinc laurate (b1) with respect to 100 parts of the EVOH (a1) in terms of the metal was used; and the zinc stearate (c1) and the zinc behenate (d1) were not used. The appearance of the resultant multilayer structure and the color tone stability of the resin composition were each evaluated in the same manner as in Example 1.

Comparative Example 2

A resin composition and a multilayer structure were each produced in the same manner as in Example 1 except that: 0.01 part of the zinc stearate (c1) with respect to 100 parts of the EVOH (a1) in terms of the metal was used; and the zinc laurate (b1) and the zinc behenate (d1) were not used. The appearance of the resultant multilayer structure and the color tone stability of the resin composition were each evaluated in the same manner as in Example 1.

Comparative Example 3

A resin composition and a multilayer structure were each produced in the same manner as in Example 1 except that: 0.01 part of zinc 12-hydroxystearate (c2) with respect to 100 parts of the EVOH (a1) in terms of a metal was used as the fatty acid metal salt having 13 to 20 carbon atoms (C); and the zinc laurate (b1), the zinc stearate (c1), and the zinc behenate (d1) were not used. The appearance of the resultant multilayer structure and the color tone stability of the resin composition were each evaluated in the same manner as in Example 1.

Comparative Example 4

A resin composition and a multilayer structure were each produced in the same manner as in Example 1 except that: 0.01 part of the zinc behenate (d1) with respect to 100 parts of the EVOH (a1) in terms of the metal was used; and the zinc laurate (b1) and the zinc stearate (c1) were not used. The appearance of the resultant multilayer structure and the color tone stability of the resin composition were each evaluated in the same manner as in Example 1.

Comparative Example 5

A resin composition and a multilayer structure were each produced in the same manner as in Example 1 except that the zinc laurate (b1), the zinc stearate (c1), and the zinc behenate (d1) were not used. The appearance of the resultant multilayer structure and the color tone stability of the resin composition were each evaluated in the same manner as in Example 1.

Comparative Example 6

A resin composition and a multilayer structure were each produced in the same manner as in Example 1 except that: 0.0237 part (0 parts in terms of a metal) of lauric acid (h1) with respect to 100 parts of the EVOH (a1), 0.0323 part (0 parts in terms of a metal) of stearic acid (h2) with respect to 100 parts of the EVOH (a1), and 0.038 part (0 parts in terms of a metal) of behenic acid (h3) with respect to 100 parts of the EVOH (a1) were used as the other additives (H); and the zinc laurate (b1), the zinc stearate (c1), and the zinc behenate (d1) were not used. The contents of the additives (h1), (h2), and (h3) with respect to 100 parts of the EVOH (a1) correspond to the contents of the fatty acid metal salts (b1), (c1), and (d1) in Example 2 with respect to 100 parts of the EVOH (a1), respectively. The appearance of the resultant multilayer structure and the color tone stability of the resin composition were each evaluated in the same manner as in Example 1.

Comparative Example 7

A resin composition and a multilayer structure were each produced in the same manner as in Example 1 except that: 0.00333 part of calcium laurate (b2) with respect to 100 parts of the EVOH (a1) in terms of a metal was used; 0.00333 part of calcium stearate (c2) with respect to 100 parts of the EVOH (a1) in terms of a metal was used; and 0.00333 part of calcium behenate (d2) with respect to 100 parts of the EVOH (a1) in terms of a metal was used. The appearance of the resultant multilayer structure and the color tone stability of the resin composition were each evaluated in the same manner as in Example 1.

Comparative Example 8

A resin composition and a multilayer structure were each produced in the same manner as in Example 1 except that: 0.00333 part of sodium laurate (b3) with respect to 100 parts of the EVOH (a1) in terms of a metal was used; 0.00333 part of sodium stearate (c3) with respect to 100 parts of the EVOH (a1) in terms of a metal was used; and 0.00333 part of sodium behenate (d3) with respect to 100 parts of the EVOH (a1) in terms of a metal was used. The appearance of the resultant multilayer structure and the color tone stability of the resin composition were each evaluated in the same manner as in Example 1.

The results of the evaluations are shown in Table 1 below together with the respective components forming the resin compositions obtained in the foregoing.

TABLE 1

| | Kind of metal | Total amount of metal salts (B + C + D) "parts by weight*1" (amount in terms of metal) | Zinc salt amount "parts by weight*1" (amount in terms of metal) | (B) Lauric acid metal salt amount "parts by weight*1" (amount in terms of metal) | (C) Stearic acid metal salt amount "parts by weight*1" (amount in terms of metal) | (C) 12-Hydroxystearic acid metal salt amount "parts by weight*1" (amount in terms of metal) | (D) Behenic acid metal salt amount "parts by weight*1" (amount in terms of metal) | Appearance of multilayer structure | Color tone stability (air atmosphere 210° C., 2 hours) |
|---|---|---|---|---|---|---|---|---|---|
| Example 1 | Zinc | 0.004 | 0.004 | 0.0017 | 0.0012 | 0 | 0.0011 | ○: 16.3 | ○○: 64.8 |
| Example 2 | Zinc | 0.0075 | 0.0075 | 0.0025 | 0.0025 | 0 | 0.0025 | ○: 30.5 | ○○: 58.9 |
| Example 3 | Zinc | 0.01 | 0.01 | 0.00333 | 0.00333 | 0 | 0.00333 | ○○: 49.2 | ○: 54.8 |
| Example 4 | Zinc | 0.01 | 0.01 | 0.00167 | 0.00167 | 0 | 0.00667 | ○○: 48.6 | ○: 54.6 |
| Example 5 | Zinc | 0.01 | 0.01 | 0.00167 | 0.00667 | 0 | 0.00167 | ○○: 46.9 | ○: 54.6 |
| Example 6 | Zinc | 0.01 | 0.01 | 0.00667 | 0.00167 | 0 | 0.00167 | ○○: 46.2 | ○: 54.6 |
| Example 7 | Zinc | 0.015 | 0.015 | 0.005 | 0.005 | 0 | 0.005 | ○○: 55.0 | ○: 53 |
| Example 8 | Zinc | 0.015 | 0.015 | 0.005 | 0 | 0.005 | 0.005 | ○○: 54.1 | ○: 53 |
| Example 9 | Zinc | 0.03 | 0.03 | 0.01 | 0.01 | 0 | 0.01 | ○○: 56.4 | ○: 52.8 |
| Example 10 | Zinc | 0.01 | 0.01 | 0.005 | 0.005 | 0 | 0 | ○○: 53 | ○: 53 |
| Example 11 | Zinc | 0.01 | 0.01 | 0.005 | 0 | 0 | 0.005 | ○○: 50 | ○: 53 |
| Example 12 | Zinc | 0.01 | 0.01 | 0 | 0.005 | 0 | 0.005 | ○○: 49 | ○: 53 |
| Comparative Example 1 | Zinc | 0.01 | 0.01 | 0.01 | 0 | 0 | 0 | ○: 42.6 | x: 45.2 |
| Comparative Example 2 | Zinc | 0.01 | 0.01 | 0 | 0.01 | 0 | 0 | ○: 41.9 | x: 45.2 |
| Comparative Example 3 | Zinc | 0.01 | 0.01 | 0 | 0 | 0.01 | 0 | ○: 40.7 | x: 45.2 |
| Comparative Example 4 | Zinc | 0.01 | 0.01 | 0 | 0 | 0 | 0.01 | ○: 33.8 | x: 46.7 |
| Comparative Example 5 | None | 0 | 0 | 0 | 0 | 0 | 0 | x: 4.2 | ○○: 70.7 |
| Comparative Example 6 | None | 0 | 0 | 0 (0.0237)*2 | 0 (0.0323)*2 | 0 | 0 (0.038)*2 | x: 4.8 | x: 40.5 |
| Comparative Example 7 | Calcium | 0.01 | 0 | 0.00333 | 0.00333 | 0 | 0.00333 | x: 5.5 | ○: 52.8 |
| Comparative Example 8 | Sodium | 0.01 | 0 | 0.00333 | 0.00333 | 0 | 0.00333 | x: 6.9 | ○○: 58.9 |

*1With respect to 100 parts by weight of the EVOH (A)
*2A value in parentheses 0 represents the amount of a fatty acid.

Example 13

A resin composition and a multilayer structure were each produced in the same manner as in Example 1 except that: 0.00207 part of the zinc laurate (b1) with respect to 100 parts of the EVOH (a1) in terms of the metal was used; 0.00082 part of magnesium stearate (c4) with respect to 100 parts of the EVOH (a1) in terms of a metal was used; 0.00132 part of calcium stearate (c2) with respect to 100 parts of the EVOH (a1) in terms of a metal was used; and the zinc stearate (c1) and the zinc behenate (d1) were not used. The appearance of the resultant multilayer structure and the color tone stability of the resin composition were each evaluated in the same manner as in Example 1. The results of the evaluations are shown in Table 2 below together with the respective components forming the resultant resin composition.

Example 14

A resin composition and a multilayer structure were each produced in the same manner as in Example 13 except that: 0.0031 part of the zinc laurate (b1) with respect to 100 parts of the EVOH (a1) in terms of the metal was used; 0.00082 part of the magnesium stearate (c4) with respect to 100 parts of the EVOH (a1) in terms of the metal was used; and the calcium stearate (c2) was not used. The appearance of the resultant multilayer structure and the color tone stability of the resin composition were each evaluated in the same manner as in Example 13. The results of the evaluations are shown in Table 2 below together with the respective components forming the resultant resin composition.

Example 15

A resin composition and a multilayer structure were each produced in the same manner as in Example 13 except that: 0.0031 part of the zinc laurate (b1) with respect to 100 parts of the EVOH (a1) in terms of the metal was used; 0.00198 part of the calcium stearate (c2) with respect to 100 parts of the EVOH (a1) in terms of the metal was used; and the magnesium stearate (c4) was not used. The appearance of the resultant multilayer structure and the color tone stability of the resin composition were each evaluated in the same manner as in Example 13. The results of the evaluations are shown in Table 2 below together with the respective components forming the resultant resin composition.

Comparative Example 9

A resin composition and a multilayer structure were each produced in the same manner as in Example 13 except that: 0.00123 part of the magnesium stearate (c4) with respect to 100 parts of the EVOH (a1) in terms of the metal was used;

0.00198 part of the calcium stearate (c2) with respect to 100 parts of the EVOH (a1) in terms of the metal was used; and the zinc laurate (b1) was not used. The appearance of the resultant multilayer structure and the color tone stability of the resin composition were each evaluated in the same manner as in Example 13. The results of the evaluations are shown in Table 2 below together with the respective components forming the resultant resin composition.

In addition, it is found that in Comparative Example 6 corresponding to the resin composition containing the EVOH (a1), the lauric acid (h1), the stearic acid (h2), and the behenic acid (h3), and the multilayer structure produced by using the resin composition, the color tone stability of the resin composition and the appearance of the multilayer structure are insufficient.

TABLE 2

| | Kind of metal | Total amount of metal salts (B + C + D) "parts by weight*1" (in terms of metal) | Zinc salt amount "parts by weight*1" (in terms of metal) | (b1) Zinc laurate amount "parts by weight*1" (in terms of metal) | (c4) Megnesium stearate amount "parts by weight*1" (in terms of metal) | (c2) Calcium stearate amount "parts by weight*1" (in terms of metal) | Appearance of multilayer structure | Color tone stability (air atmosphere 210° C., 2 hours) |
|---|---|---|---|---|---|---|---|---|
| Example 13 | Zinc Magnesium Calcium | 0.00421 | 0.00207 | 0.00207 | 0.00082 | 0.00132 | ◯: 10.2 | ◯◯: 64.7 |
| Example 14 | Zinc Magnesium | 0.00392 | 0.0031 | 0.0031 | 0.00082 | 0 | ◯: 13.8 | ◯◯: 58.9 |
| Example 15 | Zinc Calcium | 0.00508 | 0.0031 | 0.0031 | 0 | 0.00198 | ◯: 15.2 | ◯◯: 58.9 |
| Comparative Example 9 | Magnesium Calcium | 0.00321 | 0 | 0 | 0.00123 | 0.00198 | x: 6.5 | ◯◯: 58.9 |

*1With respect to 100 parts by weight of the EVOH (A)

As can be seen from the results, in each of Examples 1 to 15 each corresponding to a resin composition having the following features and a multilayer structure produced by using the resin composition, the color tone stability of the resin composition is satisfactory, and the appearance of the multilayer structure is satisfactory: the resin composition contains the EVOH (a1), and at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D); and at least one of the fatty acid metal salts selected from the fatty acid metal salts (B), (C), and (D) is a zinc salt.

In contrast, it is found that in each of Comparative Examples 1 to 4 each corresponding to a resin composition having the following features and a multilayer structure produced by using the resin composition, the appearance of the multilayer structure is satisfactory, but the color tone stability of the resin composition is insufficient: the resin composition contains the EVOH (a1), and one fatty acid metal salt selected from the fatty acid metal salt having 3 to 12 carbon atoms (B), the fatty acid metal salt having 13 to 20 carbon atoms (C), and the fatty acid metal salt having 21 to 29 carbon atoms (D); and the fatty acid metal salt selected from the fatty acid metal salts (B), (C), and (D) is a zinc salt.

In addition, it is found that in Comparative Example 5 corresponding to the resin composition having the following feature and the multilayer structure produced by using the resin composition, the color tone stability of the resin composition is satisfactory, but the appearance of the multilayer structure is insufficient: the resin composition contains the EVOH (a1), and is free of any one of the fatty acid metal salt having 3 to 12 carbon atoms (B), the fatty acid metal salt having 13 to 20 carbon atoms (C), and the fatty acid metal salt having 21 to 29 carbon atoms (D).

In addition, it is found that in Comparative Example 7 corresponding to the resin composition containing the EVOH (a1), the calcium laurate (b2), the calcium stearate (c2), and the calcium behenate (d2), and the multilayer structure produced by using the resin composition, the color tone stability of the resin composition and the appearance of the multilayer structure are insufficient.

In addition, it is found that in Comparative Example 8 corresponding to the resin composition containing the EVOH (a1), the sodium laurate (b3), the sodium stearate (c3), and the sodium behenate (d3), and the multilayer structure produced by using the resin composition, the color tone stability of the resin composition and the appearance of the multilayer structure are insufficient.

In addition, it is found that in Comparative Example 9 corresponding to the resin composition containing the EVOH (a1), the magnesium stearate (c4), and the calcium stearate (c2), and the multilayer structure produced by using the resin composition, the color tone stability of the resin composition and the appearance of the multilayer structure are insufficient.

Although specific embodiments of the present disclosure have been described in Examples above, Examples are for illustrative purposes only and are not to be construed as limitative. It is intended that various modifications apparent to a person skilled in the art fall within the scope of the present disclosure.

The resin composition of the present disclosure includes: the EVOH (A); and fatty acid metal salts, wherein the fatty acid metal salts include at least two fatty acid metal salts selected from the fatty acid metal salt having 3 to 12 carbon atoms (B), the fatty acid metal salt having 13 to 20 carbon atoms (C), and the fatty acid metal salt having 21 to 29 carbon atoms (D), and wherein at least one of the fatty acid metal salts selected from the fatty acid metal salts (B), (C), and (D) includes a zinc salt. A multilayer structure formed of the resin composition is a multilayer structure that is suppressed in occurrence of an appearance failure and is alleviated in color tone deterioration at the time of its melt molding. Thus, the multilayer structure is useful as various packaging materials for food, particularly a container for an alcohol beverage. The multilayer structure formed of the resin composition of the present disclosure is useful as a raw material for containers not only for general food but also for various materials to be packaged, such as seasonings including mayonnaise and a dressing, fermented food including a soybean paste, oil and fat food including a salad oil, beverages, cosmetics, and drugs.

The invention claimed is:

1. A resin composition, comprising:
an ethylene-vinyl ester copolymer saponified product (A), fatty acid metal salts, and
optionally, an antioxidant (H),
wherein the fatty acid metal salts comprise at least two fatty acid metal salts selected from the group consisting of
a fatty acid metal salt having 3 to 12 carbon atoms (B),
a fatty acid metal salt having 13 to 20 carbon atoms (C), and
a fatty acid metal salt having 21 to 29 carbon atoms (D),
wherein the at least two fatty acid metal salts selected from the fatty acid metal salts (B), (C), and (D) comprise a zinc salt,
wherein a total content of the zinc salt is from 0.0005 parts by weight to 0.03 parts by weight with respect to 100 parts by weight of the ethylene-vinyl ester copolymer saponified product (A) in terms of metal, and
wherein, if the antioxidant is contained, the antioxidant (H) is contained in an amount of less than 0.008% by weight based on the resin composition.

2. The resin composition according to claim 1, wherein a content of the fatty acid metal salt having 3 to 12 carbon atoms (B) is from 0.0005 parts by weight to 0.03 parts by weight with respect to 100 parts by weight of the ethylene-vinyl ester copolymer saponified product (A) in terms of a metal.

3. The resin composition according to claim 1, wherein a content of the fatty acid metal salt having 13 to 20 carbon atoms (C) is from 0.0005 parts by weight to 0.03 parts by weight with respect to 100 parts by weight of the ethylene-vinyl ester copolymer saponified product (A) in terms of a metal.

4. The resin composition according to claim 1, wherein a content of the fatty acid metal salt having 21 to 29 carbon atoms (D) is from 0.0005 parts by weight to 0.03 parts by weight with respect to 100 parts by weight of the ethylene-vinyl ester copolymer saponified product (A) in terms of a metal.

5. A multilayer structure, comprising:
a resin composition layer containing the resin composition according to claim 1,
an adhesive resin layer laminated on at least one surface of the resin composition layer, and
a thermoplastic resin layer (E) laminated on the adhesive resin layer opposed to the resin composition layer.

6. A multilayer structure, comprising:
a resin composition layer containing the resin composition according to claim 1, and
a polyamide layer laminated on at least one surface of the resin composition layer.

7. The resin composition according to claim 1,
wherein the resin composition optionally comprises a carboxyl group-containing modified polyolefin polymer, and
wherein, if the carboxyl group-containing modified polyolefin polymer is contained, the carboxyl group-containing modified polyolefin polymer is contained in an amount of 0.8% by weight or less based on the resin composition.

8. The resin composition according to claim 1, wherein the antioxidant (H) is contained in an amount of less than 0.005% by weight based on the resin composition.

9. The resin composition according to claim 1,
wherein the resin composition optionally comprises a polyolefin obtained by graft-modifying a homopolymer or copolymer of an olefin with an unsaturated carboxylic acid or an ester, and
wherein, if the polyolefin obtained by graft-modifying a homopolymer or copolymer of an olefin with an unsaturated carboxylic acid or an ester is contained, the polyolefin obtained by graft-modifying a homopolymer or copolymer of an olefin with an unsaturated carboxylic acid or an ester is contained in an amount of 0.8% by weight or less based on the resin composition.

10. A resin composition, comprising:
an ethylene-vinyl ester copolymer saponified product (A), fatty acid metal salts, and
optionally, an antioxidant (H),
wherein the fatty acid metal salts comprise at least two fatty acid metal salts selected from the group consisting of
a fatty acid metal salt having 3 to 12 carbon atoms (B),
a fatty acid metal salt having 13 to 20 carbon atoms (C), and
a fatty acid metal salt having 21 to 29 carbon atoms (D),
wherein the at least two fatty acid metal salts selected from the fatty acid metal salts (B), (C), and (D) comprise a zinc salt,
wherein a total content of the zinc salt is from 0.0005 parts by weight to 0.025 parts by weight with respect to 100 parts by weight of the ethylene-vinyl ester copolymer saponified product (A) in terms of metal, and
wherein, if the antioxidant is contained, the antioxidant (H) is contained in an amount of less than 0.008% by weight based on the resin composition.

11. The resin composition according to claim 10, wherein a content of the fatty acid metal salt having 3 to 12 carbon atoms (B) is from 0.0005 parts by weight to 0.025 parts by weight with respect to 100 parts by weight of the ethylene-vinyl ester copolymer saponified product (A) in terms of a metal.

12. The resin composition according to claim 10, wherein a content of the fatty acid metal salt having 13 to 20 carbon atoms (C) is from 0.0005 parts by weight to 0.025 parts by weight with respect to 100 parts by weight of the ethylene-vinyl ester copolymer saponified product (A) in terms of a metal.

13. The resin composition according to claim 10, wherein a content of the fatty acid metal salt having 21 to 29 carbon atoms (D) is from 0.0005 parts by weight to 0.025 parts by weight with respect to 100 parts by weight of the ethylene-vinyl ester copolymer saponified product (A) in terms of a metal.

14. A multilayer structure, comprising:
a resin composition layer containing the resin composition according to claim 8,
an adhesive resin layer laminated on at least one surface of the resin composition layer, and a thermoplastic resin layer (E) laminated on the adhesive resin layer opposed to the resin composition layer.

15. A multilayer structure, comprising:
a resin composition layer containing the resin composition according to claim 8, and
a polyamide layer laminated on at least one surface of the resin composition layer.

16. The resin composition according to claim 10,
wherein the resin composition optionally comprises a carboxyl group-containing modified polyolefin polymer, and
wherein, if the carboxyl group-containing modified polyolefin polymer is contained, the carboxyl group-containing modified polyolefin polymer is contained in an amount of 0.8% by weight or less based on the resin composition.

\* \* \* \* \*